UNITED STATES PATENT OFFICE.

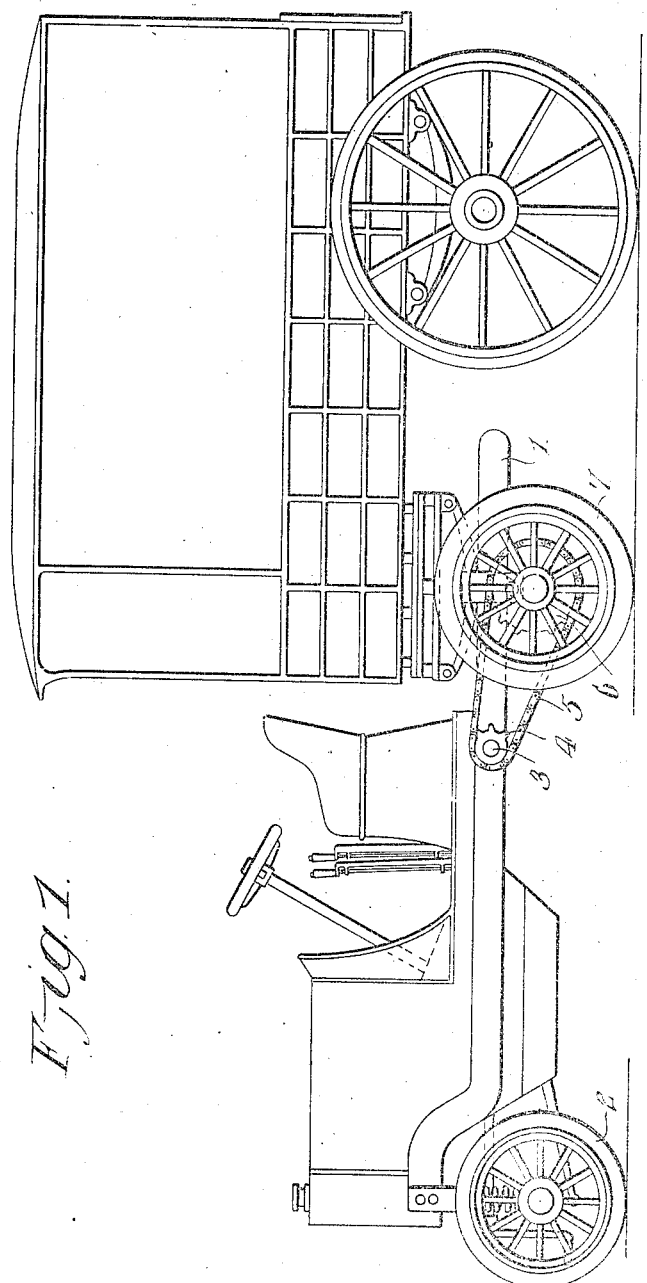

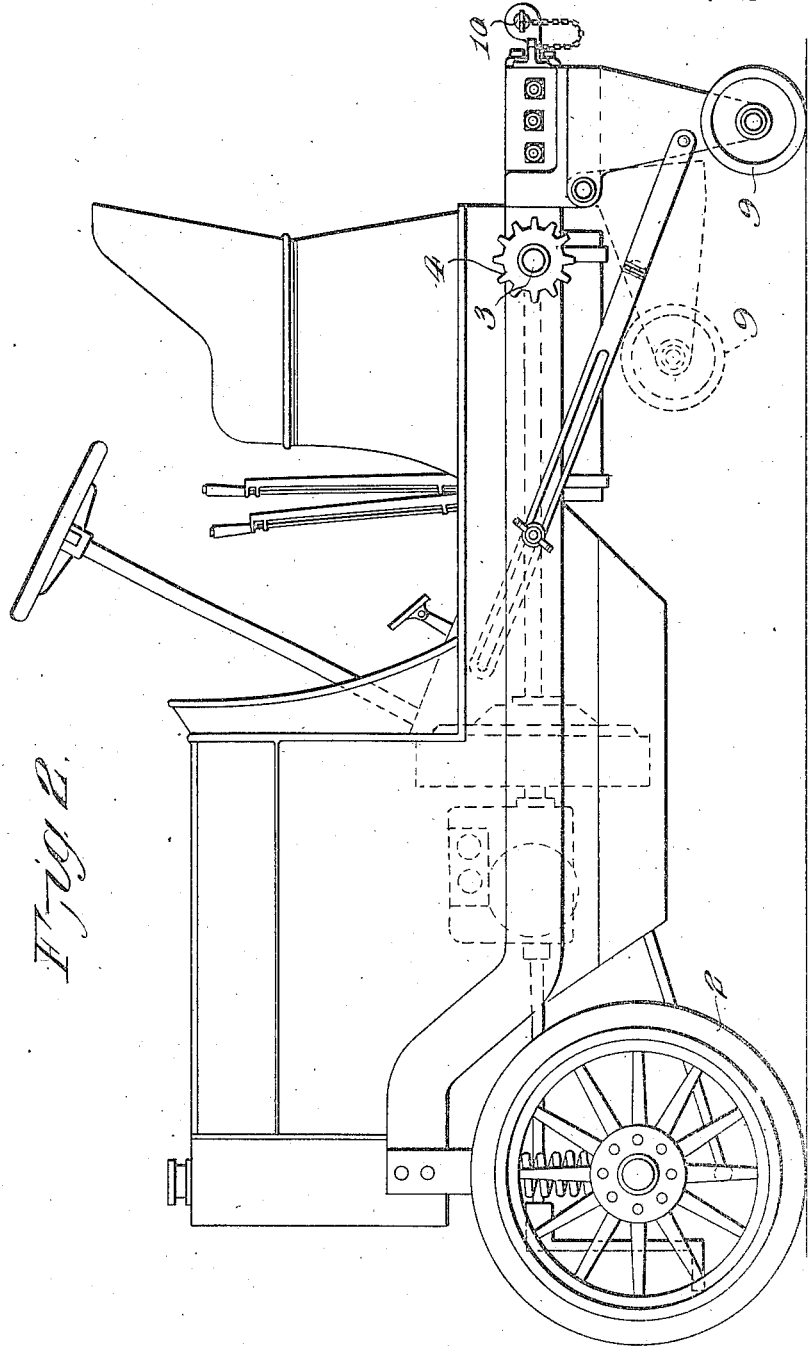

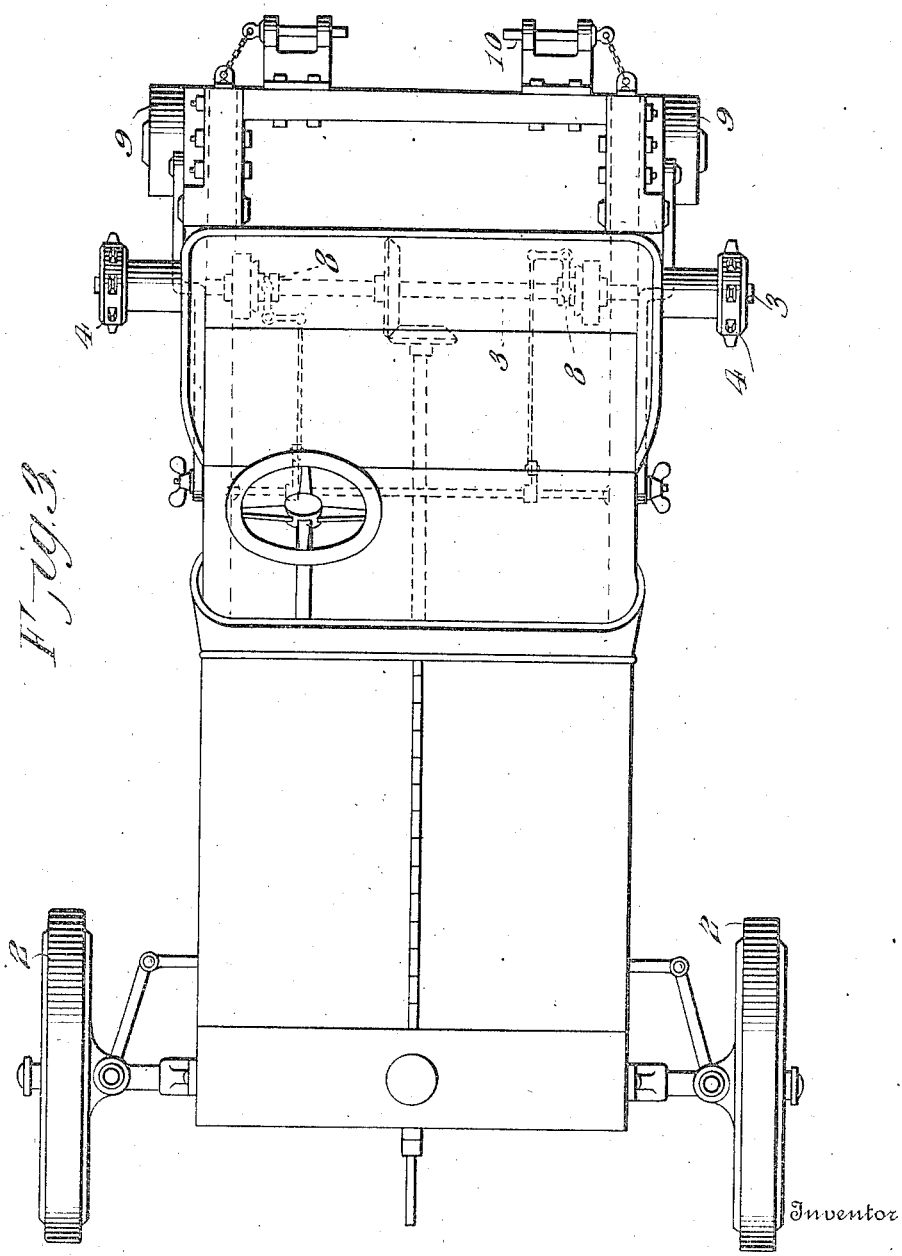

JAMES H. VENNERS, OF BROOKLYN, NEW YORK, ASSIGNOR OF ONE-HALF TO W. L. MILLSPAUGH, OF BROOKLYN, NEW YORK.

INTERCHANGEABLE MOTOR-VEHICLE.

1,106,689.   Specification of Letters Patent.   Patented Aug. 11, 1914.

Application filed February 11, 1911. Serial No. 608,037.

*To all whom it may concern:*

Be it known that I, JAMES H. VENNERS, a citizen of the United States, residing at Brooklyn, in the county of Kings and State of New York, have invented new and useful Improvements in Interchangeable Motor-Vehicles, of which the following is a specification.

It is a desideratum to propel vehicles such as drays, wagons, vans and the like by means of motive power derived from a combustion engine of the ordinary gasolene type, and in instances where such motor propelled vehicles are excluded from piers, docks and places where inflammable material is stored this invention will permit of converting the vehicle from motive power to horse drawn power, as herein described.

The present invention provides a traction motor which may be quickly coupled to or uncoupled from the horse drawn vehicle to admit of said vehicle being readily adapted to be operated either as a motor vehicle or a horse drawn vehicle.

A further purpose of the invention is the provision of a motor conveyance comprising a load carrying frame and a tractor frame, two wheels supporting the rear end of the load carrying frame, two wheels supporting both the rear end of the tractor frame and the front end of the load carrying frame, the axis of said last two mentioned wheels being revoluble about a vertical axis passing substantially through the axis of the wheels and being revoluble with respect to the load carrying frame but not with respect to the tractor frame, one or more steering wheels supporting the front of the tractor frame, a motor carried by the tractor frame, means whereby the motor may be mechanically connected with one of the two wheels supporting the front of the load carrying frame and the rear of the tractor frame and disconnected with the other and vice versa, and means whereby the steering wheels may be turned at substantially right angles to the axis of said last mentioned two wheels whereby the tractor frame may be placed at substantially right angles to the load carrying frame without materially moving the load carrying frame.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a side view, showing a traction motor and wagon coupled thereto embodying the invention. Fig. 2 is a side view of the traction motor detached from the horse drawn vehicle. Fig. 3 is a top plan view of the traction motor.

Corresponding and like parts are referred to in the following description, and indicated in all the views of the drawings, by the same reference characters.

The traction motor in general appearance is not wholly unlike an automobile of the runabout type and has a rear extension 1 to underlap the wagon or horse drawn vehicle to be coupled thereto for converting the same into a motor propelled vehicle. The traction motor is adapted to be operated by an engine of the internal combustion type and its steering wheels 2 are mounted so as to make a turn of approximately ninety degrees, whereby the traction motor may assume a position substantially at a right angle to the wagon or horse drawn vehicle when the latter is backed to the curb so as not to wholly obstruct the thoroughfare on comparatively narrow streets and highways. The framework and particularly the side bars of the chassis of the traction motor curve upwardly at their front ends to admit of the steering wheels moving thereunder when making a short curve, thereby admitting of turning the traction motor at a right angle to the wagon or horse drawn vehicle. A countershaft 3 is mounted upon the traction motor frame and is driven from the engine by any type of transmission and is provided at its ends with sprocket pinions 4, which are connected by means of sprocket chains 5 with sprocket wheels 6 connected with the drive wheels 7. Two clutches 8 are mounted upon the shaft 3 and admit of throwing either one of the sprocket pinions 3 out of gear so that the traction motor upon turning the steering wheels to an angle of substantially 90°, may be turned at a right angle or nearly so to the vehicle after the same has been backed to the curb either for receiving or discharging a load without materially moving the frame carrying body with respect to the curb.

The drive wheels 7 constitute the front wheels of the wagon or load carrying frame, or they may be considered as part of the tractor frame, but in either case their axis is rotatable about a vertical axis with respect to the wagon but not with respect to the tractor, and the vertical axis passes through the wheel axis. The ordinary fifth wheel of the vehicle serves as the vertical pivoting arrangement. The tractor frame shown in Figs. 1 and 2 is adapted to be connected to the wagon by merely removing the pole or thills and using the front wheels of the wagon as the drive wheels.

As shown in Fig. 1 the wheels 7 may be considered as part of the tractor, the front axle of the wagon being removed on attaching the tractor thereto and are provided with sprocket wheels 6 and when the traction motor is uncoupled from the axle the sprocket chains 5 are disconnected from the sprocket pinions 3 and may be supported in any manner beneath the body or bed of the wagon so as to be out of the way and in convenient position to be quickly placed in position when the traction motor is again coupled to the vehicle for propelling the same after the pole or thills have been disconnected.

A folding wheel rest 9 as shown in Figs. 2 and 3, may be employed and attached to the rear portion of the frame of the traction motor to support the same when the traction motor is disconnected from the wagon or other vehicle having the drive wheels applied thereto. The wheel rest 9 may be connected to the traction motor frame in any manner to admit of its folding so as to be out of the way when the traction motor is coupled to the wagon. Coupling pins 10 are employed for connecting the framework of the traction motor to the front axle of the wagon.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A motor conveyance comprising a load carrying frame and a tractor frame, two wheels supporting the rear end of the load carrying frame, two wheels supporting both the rear end of the tractor frame and the front end of the load carrying frame, the axis of said last two mentioned wheels being revoluble about a vertical axis passing substantially through the axis of the wheels and being revoluble with respect to the load carrying frame but not with respect to the tractor frame, one or more steering wheels supporting the front of the tractor frame, a motor carried by the tractor frame, means whereby the motor may be mechanically connected with one of the two wheels supporting the front of the load carrying frame and the rear of the tractor frame and disnected from the other and vice versa, and means whereby the steering wheels may be turned at substantially right angles to the axis of said last mentioned two wheels whereby the tractor frame may be placed at substantially right angles to the load carrying frame without materially moving the load carrying frame.

In testimony whereof I affix my signature in presence of two witnesses.

JAMES H. VENNERS.

Witnesses:
WILLIAM L. MILLSPAUGH,
FREDERIC V. COURT.